United States Patent [19]
Langer, Jr. et al.

[11] 3,755,279
[45] Aug. 28, 1973

[54] COPOLYMERIZATION OF ALPHA OLEFINS WITH STERICALLY HINDERED ALKENYL AMINES USING ZIEGLER CATALYSTS

[75] Inventors: Arthur W. Langer, Jr., Watchung, N.J.; Raymond R. Haynes, Baytown, Tex.

[73] Assignee: Esso Research and Engineering Company, Linden, N.J.

[22] Filed: June 25, 1965

[21] Appl. No.: 467,109

[52] U.S. Cl............. 260/88.1 PN, 8/39, 8/41, 8/42, 8/168, 260/88.1 PA
[51] Int. Cl............. C08f 15/00, C08f 45/66
[58] Field of Search............. 260/88.1, 88.1 PX, 260/88.3, 88.3 L

[56] References Cited
UNITED STATES PATENTS

| | | | |
|---|---|---|---|
| 3,293,326 | 12/1966 | Jezl et al. | 260/878 |
| 3,308,108 | 3/1967 | Feldhoff et al. | 260/88.1 |
| 3,332,919 | 7/1967 | Marktscheffel et al. | 260/88.1 |

*Primary Examiner*—Joseph L. Schofer
*Assistant Examiner*—C. A. Henderson, Jr.
*Attorney*—Thomas B. McCulloch, Melvin F. Fincke, John B. Davidson, John S. Schneider and Sylvester W. Brock, Jr.

[57] ABSTRACT

Alpha-olefins are copolymerized with a sterically hindered alkenyl amine in the presence of an organo-metal-transition metal catalyst (Ziegler-type catalyst). Copolymers are produced having 0.07 to 0.5 weight percent nitrogen in the copolymer.

5 Claims, No Drawings

COPOLYMERIZATION OF ALPHA OLEFINS WITH STERICALLY HINDERED ALKENYL AMINES USING ZIEGLER CATALYSTS

The invention may be briefly described as the copolymerization of an alpha-olefin with a sterically hindered alkenyl amine in the presence of an organo-metal-transition metal catalyst (a Ziegler-type catalyst) to produce new and useful copolymers.

Polymers produced by the polymerization of alpha-olefins with an organo-metal-transition metal catalyst (a Ziegler-type catalyst) have heretofore been prepared which are useful in a number of applications. Heretofore, the polymerization of alpha-olefins with a Ziegler-type catalyst to form polymers of high molecular weights and characteristics which have commercial importance have been formed expressly in the absence of polar compounds due to the adverse effect such polar compounds have on the catalyst.

It is an object of the present invention to polymerize alpha-olefins with an alkenyl amine wherein the polar amine site is sterically hindered.

Another object of the present invention is to copolymerize alpha-olefins and sterically hindered alkenyl amines employing a Ziegler-type catalyst. The sterically hindered alkenyl amines employed have sufficient steric hindrance at the amine site so that the nitrogen of the amine and the Ziegler-type catalyst do not interact to deactivate the catalyst.

Still another object is to produce a copolymer having sufficient sterically hindered alkenyl amine incorporated in the structure so that the copolymer may be easily dyed with available dyes or otherwise modified.

A specific object is to copolymerize propylene and an alkenyl hindered amine so as to form a copolymer having many of the physical properties of polypropylene but which may be dyed, painted, or modified due to the presence of the alkenyl hindered amine in the structure.

Other objects in accordance with this invention will be apparent from the more detailed disclosure set forth hereinafter.

The use of a Ziegler-type catalyst in the polymerization of alpha-olefins to form homo-polymers and certain copolymers such as ethylene-propylene and ethylene-butene is well known. An organo-metal-transition metal catalyst (a Ziegler-type catalyst) is defined for the purpose of this application as a transition metal compound of Group IV, V, VI or VII of the Periodic Table which is at least partially reduced and an organo-metallic compound of a metal selected from an alkali metal, an alkaline earth metal, zinc or aluminum. The transition metal compound may be reduced by means of chemical reaction such as using the organo-metallic compound as a reducing agent (e.g. Ziegler Belgian Pat. No. 533,362) or by using radiation, etc. Exemplary of the transition metal compounds are the halides such as the halides of titanium, zirconium, hafnium, thorium, uranium, vanadium, columbium, tantalum, chromium, molybdenum, tungsten, and mixtures thereof. The Ziegler-type catalyst may be prepared by reducing a transition metal compound such as titanium tetrachloride, titanium tetra-bromide, zirconium tetrachloride, and the like by admixing with a reducing agent such as an aluminum alkyl or other reducing organo-metallic compounds or by starting with a prereduced transition metal compound such as titanium trichloride or titanium dichloride.

The organo-metallic compound acts as the activator component of the catalyst. As mentioned above, the organo-metallic compound is sometimes used both as a reducing agent and as the activator component of the catalyst. Exemplary of the organo-metallic compounds are the alkyl or aryl derivatives of Group I-III metals, such as butyllithium, phenyl-sodium, diethyl magnesium, diethyl zinc, and the like. Preferred are the aluminum alkyls such as triethylaluminum, triisobutylaluminum, diethyl-aluminum chloride, ethylaluminum dichloride, diisobutylaluminum bromide, ethylalaminum propoxide, diethylaluminum hydride, and the like.

A preferred catalyst of the above type and one of the most active was found to be crystalline titanium chloride cocrystallized with aluminum chloride. The co-crystallized material is used together with an aluminum alkyl, e.g. triethylaluminum. The preferred catalyst has been prepared by a number of methods; see, for example, U.S. Pat. Nos. 3,032,509; 3,032,511; 3,032,513; and 3,128,252 to A. W. Langer, Jr., and E. Tornquist. Another catalyst which is suitable is titanium trichloride and triethylaluminum.

It is understood that the organo-metal- transition metal catalysts used in the polymerization of the present invention may be modified by a third component. The third component is used primarily to improve the stereoregularity of the polymer produced. Such third component materials may be certain Lewis bases, ammonium salts, or coordinate-covalent compounds such as hexamethyl-phosphoramide, tetrabutylammonium chloride and the like.

The copolymerization according to the present invention may be carried out in a wide variety of ways. The copolymerization process may be a batch or continuous operation and may be carried out with or without the use of an inert organic diluent as the reaction medium. It is preferred to carry out the copolymerization in an inert liquid organic diluent as the reaction medium. The inert liquid organic diluent may be an aliphatic hydrocarbon such as hexane, heptane; a cycloaliphatic hydrocarbon such as cyclohexane; an aromatic hydrocarbon such as xylene; halogenated aromatics such as chlorobenzene; or other known inert organic diluents or mixtures of such hydro-carbons.

The selection of the temperature and pressure used for the copolymerization process will depend upon the activity of the catalyst being used and the diluent used. In general, the copolymerization may vary over a wide range of temperatures and pressures. Using the preferred catalysts which may be represented as $TiCl_3 \cdot 1/3AlCl_3 + AlEt_3$ and $TiCl_3 + AlEt_3$, the temperature may range from about 30° to 150° C., preferably from 50° to 100° C. at a pressure of 1 to 10 atmospheres. A particularly suitable condition for the copolymerization is 70° C. at one atmosphere.

According to the prior art, polar compounds, such as alcohol, water, acetone, etc., have been used in polymerization processes using Ziegler-type catalysts to quench the polymerization mixture when the desired degree of polymerization has been reached. The polar compounds have been used in that they destroy the catalyst. According to the present invention a sterically hindered alkenyl amine which is an alkenyl amine wherein the amine polar site is sterically hindered, is copolymerized with an alpha-olefin in the presence of a Ziegler-type catalyst without destroying the catalyst. It has been found according to the present invention that a Ziegler-type catalyst will not be destroyed if the amine site is sufficiently sterically hindered.

The sterically hindered alkenyl amines which may be used in the copolymerization process of the present invention has one of the following formulae:

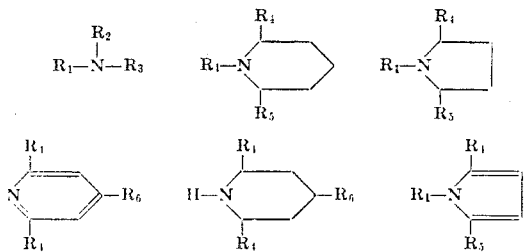

where: $R_1$ is an alkenyl radical containing 4 to 12 carbons atoms;

$R_2$ and $R_3$ are hydrogen or an alkyl group containing 1 to 8 carbon atoms, but with the sum of carbon atoms in $R_2$ and $R_3$ being less than 13;

$R_4$ is an alkyl group containing 1 to 4 carbon atoms;

$R_5$ is hydrogen or an alkyl group containing 1 to 4 carbon atoms;

$R_6$ is an alkenyl radical containing 2 to 12 carbon atoms; provided of the groups $R_1$, $R_2$ and $R_3$ at least two of the groups have a carbon branch at the alpha and/or beta positions from the nitrogen atom; of the group $R_5$, it may be hydrogen if the group $R_1$ has a carbon branch at the alpha or beta position from the nitrogen atom.

Examples of suitable hindered amines which may be used as monomers according to the present invention are N,N-diisobutyl-3-butenylamine; N,N-diisopropyl-7-octenylamine; N,N-disec-butyl-4-pentenylamine; N,N-diisopropyl-1-methyl-6-heptenylamine; N-t-butyl-1-methyl-6-heptenylamine; N-(2-ethylhexyl)-2-ethyl-4-pentenylamine; N-(4-pentenyl)-2,6-dimethylpiperidine; 2,6-di-t-butyl-4-vinylpiperidine; N-(5-hexenyl)-2,5-dimethylpyrrolidine; N-(7-octenyl)-2,5-dimethyl phrrole; N-(7-octenyl)-2,5-dimethylpyrroline; N-(1-methyl-6-heptenyl)-2-methylpyrrolidine; 2,6-diisopropyl-4-vinylpyridine and the like.

As is set forth in the foregoing specific example as well as in the above formulae, a "hindered amine" is defined as an amine or nitrogen compound wherein there are at least two carbon branches at the alpha or beta positions from the nitrogen atom.

The alpha-olefin monomers used in the copolymerization process of the present invention are selected from the alpha-olefins having 2 to 10 carbon atoms. The preferred alpha-olefin is propylene. Other suitable alpha-olefins which may be used are ethylene; 1-butene; 3-methyl-1-butene; 1-pentene; 4-methyl-1-pentene; 1-hexene; 4-methyl-1-hexene; 5-methyl-1-hexene; and the like. A mixture of two or more of the above monomers may be used according to the present invention also. That is, a terpolymer of, for example, ethylene, propylene, and the sterically hindered alkenyl amine may be prepared by a batch or continuous process employing single or multiple series reactors.

The copolymerization of the present invention is preferably carried out by dispersing the Ziegler-type catalyst in an inert organic solvent and then adding thereto the desired amount of sterically hindered alkenyl amine. To the mixture of catalyst and sterically hindered alkenyl amine is added an alphaolefin or mixtures of alpha-olefins. By this procedure the relative amount of sterically hindered alkenyl amine which is copolymerized is controlled by the relative concentration of the sterically hindered alkenyl amine to alpha-olefin. The molar ratio of sterically hindered alkenyl amine to alpha-olefin is maintained between 1:10 and 10:1 to obtain copolymers having 0.2 to 10 weight percent hindered amine in the backbone. Preferably, the molar ratio of sterically hindered alkenyl amine to alpha-olefin is 1:6 to 3:1. A preferred copolymer for dyeing will have from 1 to 5 weight percent hindered amine in the copolymer. Expressed in terms of nitrogen, a preferred copolymer would contain 0.07 to 0.5 weight percent nitrogen.

A "copolymer" as used in this application is defined as on page 36 of Flory's, Principles of Polymer Chemistry, Cornell University Press (1953) which states:

"Polymeric substances containing two or more structural units combined more or less in random sequence are then distinguished by the term copolymer." The copolymers of the present invention are characterized by the sterically hindered alkenyl amine monomers and the alpha-olefin monomers.

The dyeable copolymers of this invention may be blended with alpha-olefin homopolymers or copolymers to obtain a variety of new compositions. For example, homopolymers of ethylene or propylene or copolymers of ethylene and propylene may be blended with the copolymer of this invention so long as the amount blended does not unduly minimize the superior properties for the use intended.

The invention will be further illustrated by the following specific examples which are given by way of illustration and not as limitations on the scope of the invention.

EXAMPLE 1

To a 1-liter reactor was added 500 ml. xylene, 1.3 mmoles of $TiCl_3·1/3\ AlCl_3$, 3.6 mmoles of triethyl aluminum, 1.8 mmoles of hexamethylphosphoramide, and 56 mmoles of N,N-diisopropyl-7-octenylamine. Propylene was added at the rate of 3 moles/hr. and the reaction mixture was brought to 70° C. and maintained at that temperature for 1 hour. The reaction was then killed by pouring the mixture into 500 ml. methanol. The precipitated polymer was removed by filtration and washed twice in a Waring Blender with 200 ml. portions of methanol. The product was vacuum dried, and it weighed 42.6 g. Extraction of the polymer gave the following data:

| | |
|---|---|
| Ether solubles | 1.04 wt. % |
| Heptane solubles | 7.70 wt. % |
| Heptane insolubles | 91.26 wt. % |

The nitrogen content of the total polymer was 0.16 percent. The ether and heptane soluble fractions both contained 0.36 percent nitrogen. The heptane insoluble fraction contained 0.13 percent nitrogen.

An identical polymerization, but in the absence of N-,N-diisopropyl-7-octenylamine yielded 43.2 g. of polymer. Upon extraction, 1.0 weight percent was ether soluble, 5.6 weight percent was heptane soluble, and 93.4 weight percent was heptane insoluble.

EXAMPLE 2

Butene-1 and N,N-diisopropyl-7-octenylamine were polymerized as described in Example 1 except no hexamethylphosphoramide was added. The polymerization gave 33.0 g. of a polymer with 0.32 percent N when 45 mmoles of the amine was added to the polymerization.

An identical polymerization, except in the absence of the amine, yielded 34.0 g. of polybutene-1.

From the foregoing examples, it is evident that copolymers may be formed with the sterically hindered alkenyl amine monomers and a variety of alpha-olefins with no loss in catalyst activity.

EXAMPLES 3–7

Polymerizations were carried out using the procedure described in Example 1 and a catalyst consisting of 1.3 mmoles $TiCl_3 \cdot 1/3$ $AlCl_3$ and 3.6 mmoles $AlEt_3$, but varying the alkenyl amine concentrations for a hindered and non-hindered amine. The results are shown in Table I.

TABLE I

Copolymerization of Propylene and Alkenylamines[a]
1.3 mmoles $TiCl_3 \cdot 1/3$ $AlCl_3$, 3.6 mmoles $AlEt_3$

| Polar Monomer | Relative Catalyst Activity | % Nitrogen in Copolymer |
|---|---|---|
| - | 1.0 | |
| Hindered | | |
| N,N-Diisopropyl-7-octenylamine (56 mmoles) | 0.98 | 0.16 |
| N,N-Diisopropyl-7-octenylamine (224 mmoles) | 1.01 | 0.46 |
| Unhindered | | |
| N,N-Diethyl-4-pentenylamine (3.0 mmoles) | 0.99 | 0.01 |
| N,N-Diethyl-4-pentenylamine (6.0 mmoles) | 0.06 | 0.04 |

[a] All runs were at atmospheric pressure for a duration of 1 hour. The propylene feed rate was 3 moles/hr.

As can be seen from the foregoing examples, when the molar concentration of the unhindered amine is greater than the molar concentration of $AlEt_3$, the catalyst system is deactivated (rel. activity=0.06). But, when the molar concentration of the hindered amine is greater than the molar concentration of $AlEt_3$, no decline in catalyst activity is observed. Since the percent nitrogen in the copolymer is determined by the concentration of the alkenyl amine, the sterically hindered alkenyl amines of the present invention allow levels of nitrogen unobtainable with the unhindered amine.

EXAMPLES 8–10

N,N-diisopropyl-3-butenylamine, N,N-diisopropyl-4-pentenylamine, and N,N-diisopropyl-5-hexenylamine were also copolymerized with propylene. The data for these polymerizations is given in Table II. Conditions for these runs are identical to those given in Example 1. No decrease in catalyst efficiency was noted in these polymerizations.

TABLE II

| Polar Monomer | % Nitrogen in Copolymer |
|---|---|
| N,N-diisopropyl-3-butenylamine (64 mmoles) | 0.11 |
| N,N-diisopropyl-4-pentenylamine (70 mmoles) | 0.31 |
| N,N-diisopropyl-5-hexenylamine (64 mmoles) | 0.19 |

EXAMPLE 11

To a 1-gallon reactor was added 1300 ml. of hexane, 158 mmoles of aluminum triethyl, 79.6 mmoles titanium trichloride, and 557 mmoles of N,N-diisopropyl-7-octenyl amine. One hundred grams of propylene was added, causing the pressure to rise to 40 psig. The temperature increased to 166° F. and was maintained at 166±6° F. for the course of an hour during which time an additional 150 grams of propylene was added. The reaction was then killed by the addition of 1300 ml. of methanol. The resulting slurry was stirred, filtered, and washed twice with methanol in a Waring Blender to give 240 grams of polymer. The resulting polymer was 80.1 wt. percent heptane insoluble and contained 0.37 percent nitrogen. The polymerization under identical conditions, except in the absence of the amine, yielded 242 grams of polymer insoluble. was 74 wt. percent heptane insoluble The copolymers of the present invention are especially suitable for dyeing. With present technology a level of 0.08 percent nitrogen in the copolymer is necessary for acceptable dyeability. Also, films and pads of the copolymers, besides being dyeable, show receptiveness and fastness to painting and printing. The suitability of the copolymers of the present invention for dyeing is illustrated in the following example.

EXAMPLE 12

A copolymer of propylene and N,N-diisopropyl-7-octenylamine containing 0.18 percent nitrogen was melt spun and drawn 4:1 to give a fiber whose dyeability was determined as follows:

A 3 percent dye bath was prepared on the basis of 30 parts by weight of water to 1 part of polymer. Each dye is employed in accordance with the instructions provided by the manufacturer, and generally, are all used in a hot aqueous dye bath. The dyes are employed in a concentration based on the weight of the fiber to be dyed in that bath. A detergent, Triton X100, at about 0.3 percent by weight was added to the dye bath, and the dye bath adjusted to a pH of 4.0 with acetic acid. The copolymer was placed in the dye bath (205° F.) for one hour.

The copolymer of the present invention, when formed in fibers, pads or films and dyed under the foregoing conditions gave deep colors with Irgalan Yellow GL (C.I. Acid Yellow 114), Vialon Orange F (premetallized dye of B.A.S.F.), Erio Anthracene Brilliant Blue 2 GL (C.I. Acid Blue 40), Celanthrene Fast Blue (C.I. Disperse Blue 7), and similar dyes. The deep colors were retained even after scouring for 15 minutes at 160° F. in an aqueous solution containing 0.5 percent by weight of sodium carbonate and 0.5 percent of Triton X100.

A polypropylene fiber subjected to the above-described dye bath became only very faintly stained, and when subjected to scouring retained no color.

For the purpose of the application the term "alkenyl" means the radical having the following formula:

$H_2C=CH-(C_nH_{2n})-$ where n is 0 or a whole number.

The nature and object of the present invention having been completely described and illustrated and the best mode thereof contemplated set forth, what we wish to claim as new and useful and secure by letters Patent is:

1. A copolymerization process which comprises contacting under polymerization conditions in the presence of an organo-metal-transition metal catalyst an alpha-olefin containing 2 to 10 carbon atoms and an alkenyl amine having one of the following formulae:

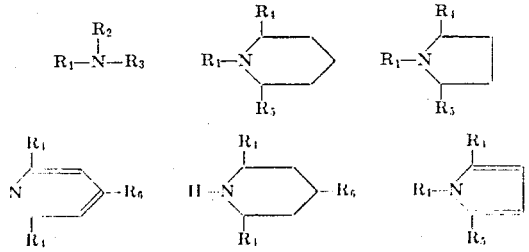

where: $R_1$ is an alkenyl radical containing 4 to 12 carbon atoms;

$R_2$ and $R_3$ are selected from the group consisting of hydrogen and an alkyl group containing 1 to 8 carbon atoms, with the sum of carbon atoms of $R_2$ and $R_3$ being less than 13;

$R_4$ is an alkyl group containing 1 to 4 carbon atoms;

$R_5$ is selected from the group consisting of hydrogen and an alkyl group containing 1 to 4 carbon atoms;

$R_6$ is an alkenyl radical containing 2 to 12 carbon atoms; and of the groups $R_1$, $R_2$ and $R_3$, at least two of the groups have a carbon branch at the alpha or beta positions from the nitrogen atom; and $R_5$ may be hydrogen provided the group $R_1$ has a carbon branch at the alpha or beta position from the nitrogen atom.

2. A copolymerization process according to claim 1 wherein said alpha-olefin is propylene.

3. A process according to claim 2 wherein said organo-metal-transition metal catalyst is $TiCl_3 \cdot 1/3\ AlCl_3 + AlEt_3$ and the temperature is within the range of 30° C. to 150° C. at a pressure of 1 to 10 atmospheres.

4. A process according to claim 3 wherein said amine and said propylene are maintained in a molar ratio between 1:10 and 10:1.

5. A process according to claim 2 wherein said organo-metal-transition metal catalyst is selected from the group consisting of $TiCl_3 \cdot 1/3\ AlCl_3 + AlEt_3$ and $TiCl_3 + AlEt_3$ and the temperature is within the range of 50° C. to 100° C. at a pressure of 1 to 10 atmospheres and the molar ratio of said amine to propylene is 1:6 to 3:6.

* * * * *